(12) United States Patent
Gotoh et al.

(10) Patent No.: US 6,229,085 B1
(45) Date of Patent: May 8, 2001

(54) ELECTROMAGNETIC WAVE LEAKAGE ATTENUATION FILTER

(76) Inventors: Yukio Gotoh; Hiroki Sato, both of c/o Fujitsu General Limited, 1116, Suenaga, Takatsu-ku, Kawasaki-shi, Kanagawa-ken 213 (JP)

(*) Notice: Subject to any disclaimer, the term of this patent is extended or adjusted under 35 U.S.C. 154(b) by 0 days.

(21) Appl. No.: 09/142,618
(22) PCT Filed: Oct. 25, 1996
(86) PCT No.: PCT/JP96/03123
  § 371 Date: Sep. 10, 1998
  § 102(e) Date: Sep. 10, 1998
(87) PCT Pub. No.: WO97/34313
  PCT Pub. Date: Sep. 18, 1997

(30) Foreign Application Priority Data

Mar. 13, 1996 (JP) .................................................. 8-056153
Mar. 13, 1996 (JP) .................................................. 8-056154

(51) Int. Cl.[7] .................................................. H05K 9/00
(52) U.S. Cl. .................................. 174/35 MS; 313/134; 313/461; 348/818; 348/842
(58) Field of Search .................. 174/35 MS; 313/461, 313/134; 348/818, 842

(56) References Cited

U.S. PATENT DOCUMENTS 4,874,903 * 10/1989 Clarke ............................. 174/35 MS
5,139,850 * 8/1992 Clarke et al. ...................... 428/192
5,539,275 * 7/1996 Arimoto et al. .................... 313/461

FOREIGN PATENT DOCUMENTS 62-199999   12/1987 (JP) .
5-283889    10/1993 (JP) .
8-055581  * 2/1996  (JP) .

* cited by examiner

Primary Examiner—William A. Cuchlinski, Jr.
Assistant Examiner—Ronnie Mancho
(74) Attorney, Agent, or Firm—Flynn, Thiel, Boutell & Tanis, P.C.

(57) ABSTRACT

A filter 2A(2C), which prevents the leakage of electromagnetic waves from a PDP 1, is provided with a filter base 11 in front of the PDP 1 and a grounded conductive mesh 12 which transmits light from the base 11 on the PDP 1 side. A light scattering layer 13 is bonded to the mesh 12 by a conductive adhesive 14 which transmits light, and the spaces of the lattice, when the base 1 exists, of the mesh 12 are filled with the adhesive 14 so that, when an electric charge is induced in the mesh 12 by a pulse voltage applied to the PDP 1 for write/erase, the voltage across the lattice of the mesh 12 is made nearly equal to the potential of the mesh 12 so as not to cause an electric discharge and generate noise. Alternatively, a transparent antistatic layer 22 is provided between the PDP 1 and the mesh 12 so as not to generate noise by lowering the pulse voltage applied to the PDP 1 for write/erase to such a low value that no electric discharge occurs when electric charges are induced in the mesh 12 by the pulse voltage.

8 Claims, 6 Drawing Sheets

ELECTROMAGNETIC WAVE LEAKAGE ATTENUATION FILTER

TECHNICAL FIELD

The present invention relates to an electromagnetic wave leakage attenuation filter with a filter base provided on the frontal face on an image displaying portion, wherein a light transmitting conductive mesh is mounted on the surface of the image displaying portion side of the filter base, and the conductive mesh is grounded to keep the electromagnetic wave from the image displaying portion from leaking out.

BACKGROUND TECHNOLOGY

The image displaying portion used in an image display includes a gas discharging display panel, for example a plasma display panel (hereunder referred to simply as "PDP"). The PDP excites the molecules of the gases sealed up inside by discharging between the electrodes (more specifically, it mixes up the xenon gas and neon gas, and brings assistance to the excitation of the xenon gas molecules), excites further the fluorescent substance coated inside by the ultraviolet radiation generated, thus emitting the visible light to display an image. The discharge and the like under these conditions however generate an electromagnetic wave which leaks out, though small in quantity.

Figure 1:
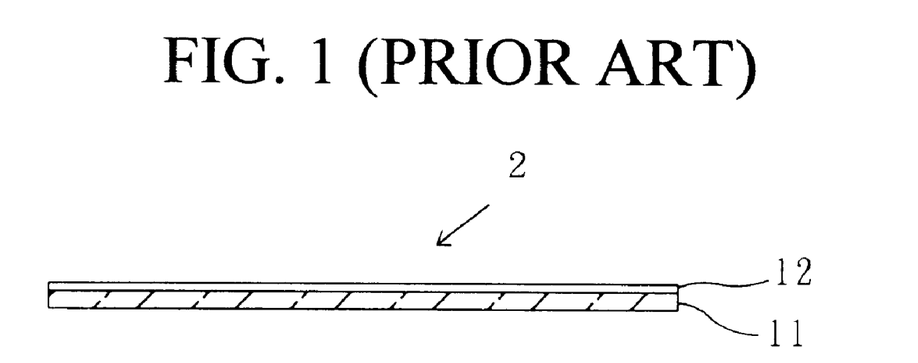
FIG. 1 represents an elevational cross-section view of the essential part of a conventional electromagnetic wave leakage attenuation filter.
Figure 2:
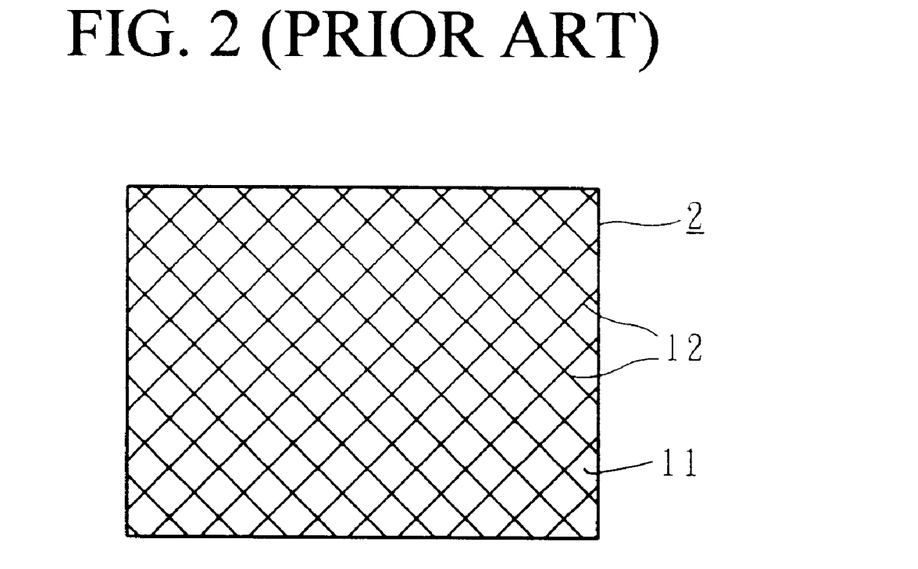
FIG. 2 is a top view of the essential part as shown in FIG. 1.
Figure 3:
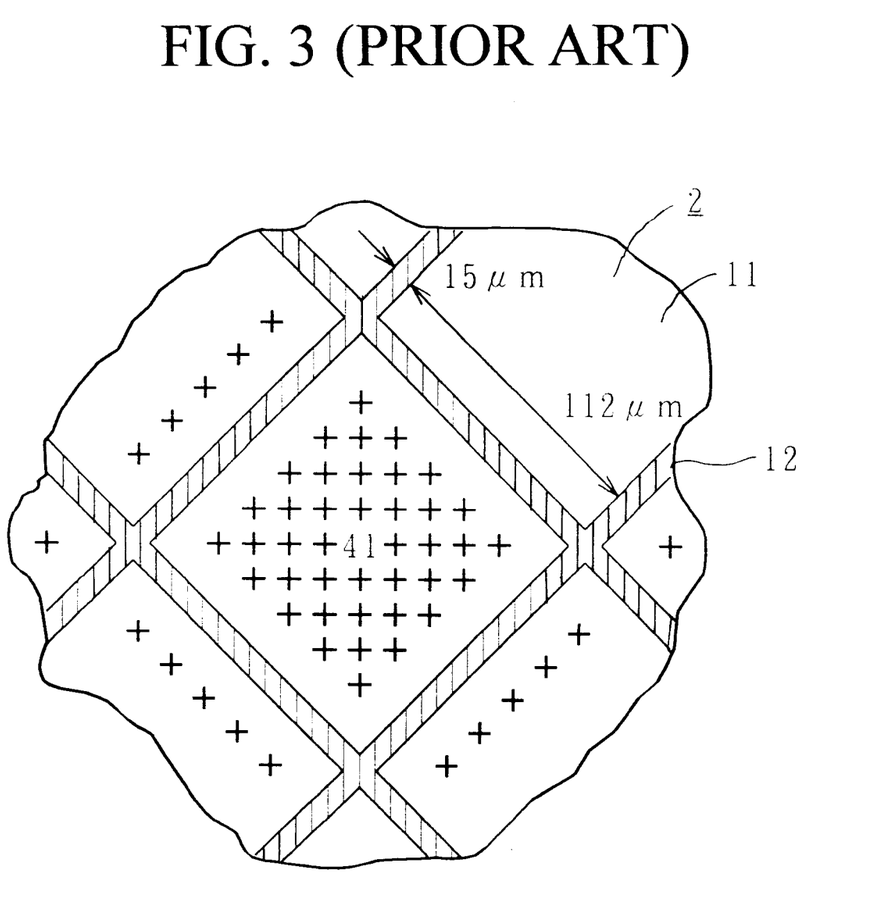
FIG. 3 is a fragmentary enlarged view of FIG. 2.

To prevent this electromagnetic wave from leaking out, an optical filter provided on the frontal face of the PDP to intercept wavelengths in the near infrared region is endowed with an electromagnetic wave leakage attenuation feature. This function of preventing the electromagnetic wave from leaking out is achieved by providing, as shown in FIGS. 1 and 2, a filter base 11 consisting of a synthetic resin plate such as an acrylic, the base material of the optical filter (referred to simply as "filter"), with a web-like formed conductor (referred to simply as "conductive mesh 12"). As shown in FIG. 3, the conductor width and intervals of the grids of the conductive mesh 12 have been set to their optimal values so that the conductive mesh as grounded may cover the frequency range of the electromagnetic wave to be prevented from leaking out and not interfere with the light image. That is, the electric charge generated at the conductive mesh 12 by the electromagnetic wave is grounded by connecting the conductive mesh 12 to the enclosure of the PDP with the orientation of the mesh being set obliquely, as shown in FIGS. 2 and 3, so that the matrices of the PDP pixels are not covered by the mesh conductor and intercept the image light.

Note here that the PDP applies about 350 V of pulse voltage between the electrodes at a predetermined period required for write/erase (the data of all the pixels is erased all at once to write a new image data into respective pixels). Since the filter 2 is arranged in the vicinity of the frontal face of the PDP, the frontal glass of the PDP and the filter 2 come into a status of capacitive coupling, said pulse voltage for write/erase generates an electric charge during said required period at the conductive mesh 12 of the filter 2 through the capacitive coupling. Though this electric charge produces an instantaneous voltage (approx. 140 V max. as measured) between the conductive mesh 12 and ground due to the impedance of the grounded circuit, the voltage of the conductive mesh 12 as continued to the ground becomes 0 V. Because, on the other hand, the electric charge imparts itself to the portion 41 as surrounded by the grids of the conductive mesh 12 (where there exists an acrylic adhesive) as shown in FIG. 3, together with the generation of the instantaneous voltage (about 140 V), the charge remains even after the voltage of the conductive mesh 12 becomes 0 (zero). The charged portion being within point-blank range of the conductive mesh 12, surpasses the withstand voltage to discharge (sparks) instantaneously toward the conductive mesh 12 at the same time when the voltage of the mesh lowers down to 0 V.

When, for example, the PDP is an AC (alternating current) driven type, the image signal is of NTSC system, and one field is divided into six subfields for driving, then the repeated (required) frequency of the voltage generation of the conductive mesh 12 is about 360 Hz (60 fields×6 subfields=360 Hz) with the discharging repeated at about 360 Hz too, and accordingly the spark noise is heard as an abnormal noise.

The present invention, arrived at in light of the foregoing problematical points, is intended to keep any abnormal noise due to the discharging of the imparted charge from occurring by reducing the electric charge as generated at the conductive mesh 12 or else by preventing the charge from imparting itself between the grids of the conductive mesh 12 (region where the filter base exists, including the portion 41 surrounded by the grids themselves; the same will prevail for the following texts) when the pulse voltage as applied to the image displaying portion (the pulse voltage applied to the PDP for write/erase, for instance) generates an electric charge at the conductive mesh 12.

DISCLOSURE OF THE INVENTION

The electromagnetic wave leakage attenuation filter according to the present invention is characterized in that a filter base is provided on the frontal face of an image displaying portion (a PDP, for example), a light transmitting conductive mesh is mounted on the surface of the image displaying portion side of the filter base, and this conductive mesh is grounded, adhering, on this conductive mesh, a light scattering layer intended to expose the exterior light to irregular reflection by means of a light transmitting conductive adhesive.

When an electric charge is generated on the conductive mesh by the electromagnetic wave coming from the image displaying portion, this electromagnetic wave cannot leak out because the conductive mesh is grounded.

Since the conductive adhesive fills up the grids of the conductive mesh electrifying them, the pulse voltage as applied to the image displaying portion (for example, the pulse voltage applied to the PDP for write/erase) generates an electric charge at the conductive mesh. When this charge continues to the ground, the voltage between the grids of the conductive mesh always comes to be the same potential as the conductive mesh, thus avoiding the discharge and correspondingly any abnormal noise.

The light scattering layer reflects irregularly the exterior light incidental to the image displaying portion from the exterior, exhibiting thus a glare shielding effect (namely, the glare is prevented).

The electromagnetic wave leakage attenuation filter of the present invention is characterized in that a filter base is provided on the frontal face of an image displaying portion (for example, PDP), a light transmitting conductive mesh is mounted on the surface of the image displaying portion side of the filter base, the conductive mesh is grounded, and a transparent antistatic layer is provided between this image displaying portion and the conductive mesh.

As in the case of the foregoing invention, the conductive mesh as grounded does keep the electromagnetic wave coming from the image displaying portion from leaking out.

Since a transparent antistatic layer is provided between the image displaying portion and the conductive mesh, even if the pulse voltage to be applied to the image displaying portion (for example, the pulse voltage applied to the PDP for write/erase) generates an electric charge on the conductive mesh, this voltage is lowered, thus preventing any discharge and consequently any abnormal noise.

BEST FORM TO EXECUTE THE INVENTION

Figure 4:
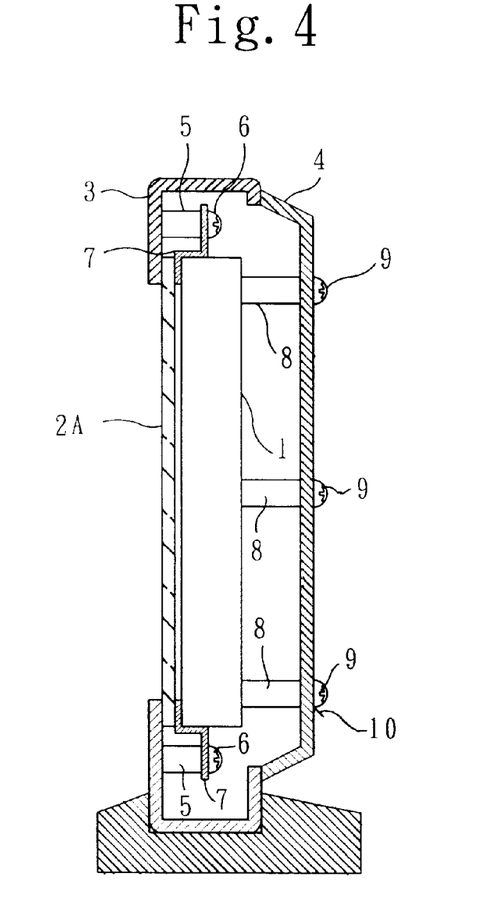
FIG. 4 is a schematic diagram of the electromagnetic wave leakage attenuation filter as mounted on a display according to an embodiment of the present invention.
Figure 5:
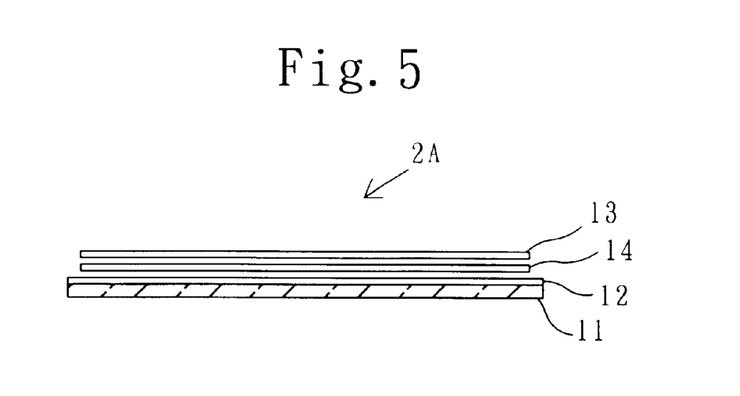
FIG. 5 represents an elevational cross-section view of the essential part of the electromagnetic wave leakage attenuation filter as shown in FIG. 4 with a fragmentary exploded view thereof.
Figure 6:
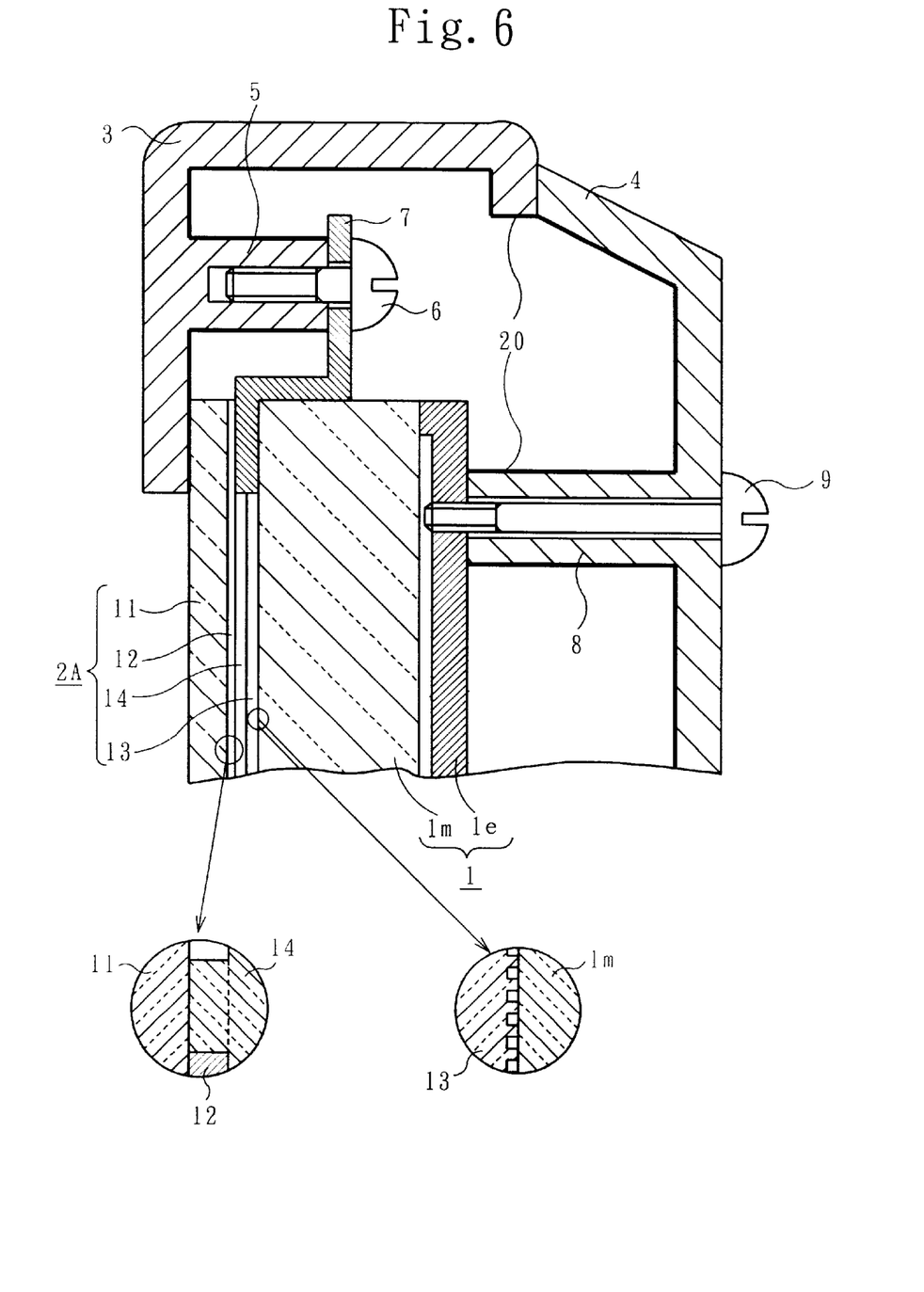
FIG. 6 is a grossly enlarged view of a part of the filter shown in FIG. 4 with further greatly enlarged views of the parts thereof.

Referring now to the attached drawings, we will describe in detail the present invention, especially the first embodiment of the present invention referring to FIGS. 4 to 6.

In FIG. 4, the numeral 1 represents a PDP, 2A an electromagnetic wave leakage attenuation filter (referred to simply as "filter"), 3 the frontal portion of an enclosure, and 4 the rear portion of the same enclosure. Attached to the periphery of said filter 2A are the mounting brackets 7, which are fastened into the mounting bosses 5 of the frontal portion of the enclosure 3 with the screws 6 to fasten the filter 2A to the frontal portion of the enclosure 3. The PDP 1 is fixed to the rear portion of enclosure 4 by screws 9 through the mounting bosses 8. Mounting the rear portion 4 of enclosure on the frontal portion 3 of enclosure enables the attachment of the periphery of the PDP 1 to the mounting brackets 7, which are made forcibly to contact the filter 2A so that they may come into close contact with the conductive mesh 12 (to be described later in this text) pulled out from the periphery of the filter 2A. A conductive coat 20 as shown in FIG. 6 is formed making conductive the mounting bosses 5, the inner face of the frontal portion of enclosure 3, the inner face of the rear portion of enclosure 4, and the mounting bosses 8. Through this conductive coat 20, the conductive mesh 12 is connected to the metallic portion (ground) 1e on the back of the PDP 1, and the electric charge generated on the conductive mesh 12 by the electromagnetic wave radiated from the body of the PDP 1 is conducted to the ground through the grounding terminal 10.

As shown in FIGS. 5 and 6, said filter 2A comprises the filter base 11, the conductive mesh 12 provided on one face of the filter base 11, the AG (Anti-Glare) film 13, and the conductive adhesive 14 for adhering the AG film 13 on the conductive mesh 12, which electrifies at the same time as the grids of the conductive mesh 12.

The filter base 11 has been so formed to absorb a red color in addition to a blue color, by mixing a colorless, transparent and impact resistant synthetic resin, such as an acrylic or polycarbonate, with a pigment for the selective absorption filter that absorbs the red color light emitted from the PDP 1. Further, said filter base 11 has been so formed that it has a near infrared radiation absorbing filter layer (not shown) which absorbs the line spectrum (an example of a particular visible light) released from the PDP 1 in the near infrared region (800 nm to 1000 nm) and that consequently there should arise no interference with an infrared radiation remote controller or optical communication equipment to be installed in the peripheral area.

The conductive mesh 12 is formed by electroless plating of a metal such as copper in a required thickness (0.1 $\mu$m, for example) on the filter base 11 through a resist layer, another electroless plating of a metal such as nickel thereon in a required thickness (100 Å, for example), and yet further by a photoresist thereon. Any resist other than on the mesh conductor will then be removed by ultraviolet rays. Finally, etching finishes the conductive mesh 12. The screen size and pixel pitch of the PDP 1 are to be taken into account so that any visible light may well be transmitted and the electromagnetic wave may be intercepted in the frequency range of 30 MHz to 130 MHz by positioning, as show in FIG. 3, the conductor width (15 $\mu$m) and conductor intervals (127 $\mu$m) in such a fashion that any electromagnetic wave within said frequency range may be shielded. Further, the orientation of the mesh is slanted by 45° so that the mesh should not overlap the rows/columns (vertical/horizontal) of the pixels of the PDP 1 and hinder the image. By electroless plating of a metal with a high conductivity, such as copper and copper-nickel, on a mesh fabric of synthetic resin, the conductive mesh 12 may be made into metallic woven fabric, and adhered to the filter base 11, or else may be sandwiched by the layers of the filter base 11 as divided into two. Due to the thinness of the mesh (that is, conductor width) being limited, the metallic woven fabric is not suited to any PDP 1 of a small caliber, but is effective for any large caliber of 40 to 50 inch type, for example.

As shown in FIG. 6, the fragmentary enlarged view, said AG film 13 is an example of a light scattering layer, which has minute roughness on the surface of a colorless, transparent film, and scatters by irregular reflection the light from, for example, a lighting fixture to thus prevent any glare and overlap with the image of PDP 1, which makes it difficult to view the screen. Said AG film 13 is adhered to the conductive mesh 12 by means of the conductive adhesive 14.

The conductive adhesive 14 consists of a mixture of an acrylic adhesive with fine particles, as a mixture, of conductive metallic oxides, such as stannic oxide, and antimony to endow it with conductivity.

As shown in FIGS. 4 and 6, the filter 2A is mounted on the frontal face of the PDP 1 with the AG film 13 side brought to the PDP 1 side, is electrified with the pullout portion of the conductive mesh 12 attached to the mounting bracket 7, and the conductive mesh 12 is connected to ground all through the mounting bracket 7, conductive coat 20, metallic portion 1e and through the grounded terminal 10. By opposing the AG film 13 to the PDP 1, the filter 2A does not come into close contact with the surface of the PDP 1 due to the rugged surface of the AG film 13 when the filter 2A is made to contact the frontal face of the PDP 1, thereby enabling the prevention of the generation of Newton's rings (bright and dark concentric circles).

Since, as has thus far been described, the filter 2A of the present invention makes it possible that the grids of the conductive mesh 12 (where the filter base 11 is) provided to prevent the electromagnetic wave leakage of the PDP 1 are filled with the conductive adhesive 14, the pulse voltage to be applied onto the PDP 1 for write/erase generates an electric charge on the conductive mesh 12, when the voltage between the grids of this conductive mesh 12 is always at almost the same potential with that of the conductive mesh 12 itself, thereby avoiding any electric discharge and, accordingly, any abnormal noise.

In the case where the conductive adhesive 14 is not applied on the conductive mesh 12, as with the prior art, the write/erase of the PDP 1 generates on the conductive mesh 12 about 140 V of electric charge, which is imparted to the portion 41 surrounded by the grids of this conductive mesh 12 as shown in FIG. 3. This charge of the conductive mesh 12 will remain because of the filter 2, which is a high insulator, even after it flows to ground to be 0 V through the mounting bracket 7. It discharges toward the conductive mesh 12, which is now at 0 V. Conversely, in the case of the embodiment of the present invention as shown in FIGS. 4 to 6, the conductive adhesive 14 is applied onto the conductive mesh 12, penetrating in between the grids of the conductive mesh 12, which are therefore electrified. Thus, the voltage between the grids (including the portion 41 surrounded by the grids) always remains almost at the same potential with that of the voltage of the conductive mesh 12 without, therefore, any electric discharge or any abnormal noise.

Figure 7:
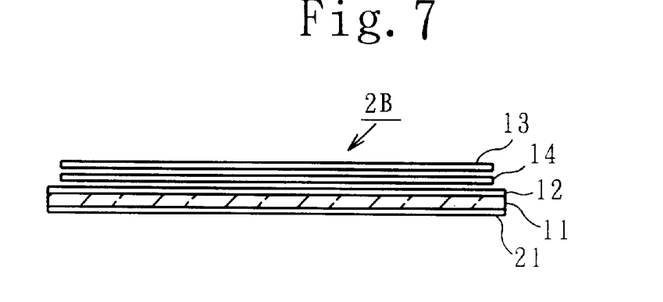
FIG. 7 depicts an elevational cross-section view of the essential part of an embodiment wherein an AR film is provided on the electromagnetic wave leakage attenuation filter as shown in FIG. 5.

FIG. 7 shows an embodiment of the present invention where the filter 2B is formed by adhering an AR (Anti-Reflection) film 21 on the external face of the filter base 11 (lower portion in the figure) in the filter 2A shown in FIGS. 4 to 6. Said AR film 21, which is an example of a light reflection prevention layer, is made by the vacuum evaporation of plural superposed films from materials of different refractive indices, on the surface, for example, of a transparent film or by the application of a fluororesin into a film. The light incident to the filter body is exposed to complex refraction to make it difficult for the light to return thus circumventing the decrease in the contrast of the image due to the reflection of the exterior light.

Figure 8:
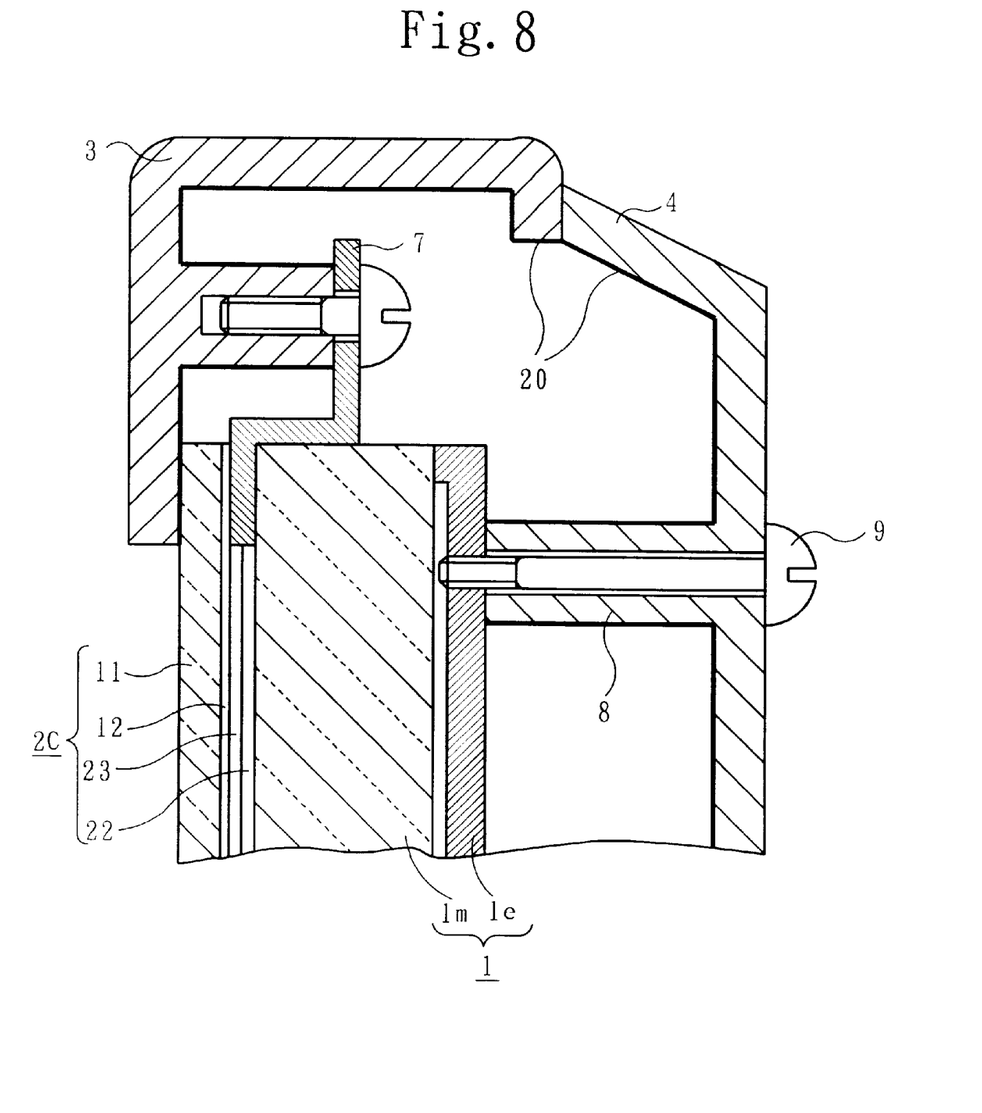
FIG. 8 is another enlarged view of the essential part of the electromagnetic wave leakage attenuation filter as mounted on a display according to another embodiment of the present invention.
Figure 9:
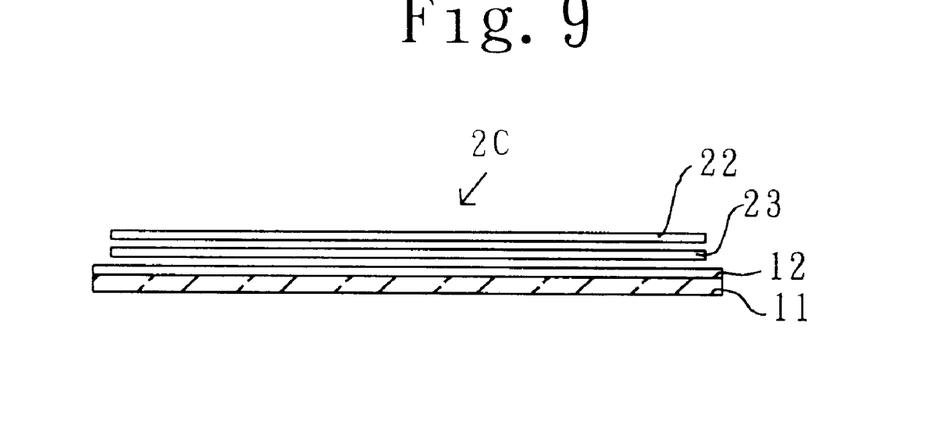
FIG. 9 illustrates an elevational cross-section view of the essential part of the electromagnetic wave leakage attenuation filter shown in FIG. 8 with a partial exploded view thereof.

Next, we will explain the second embodiment of the present invention referring to FIGS. 8 and 9.

In FIGS. 8 and 9, like numerals and characters represent like parts as in FIGS. 4 to 6, omitting a part of the description. In these figures, the numeral 1 represents a PDP, 2C an electromagnetic wave leakage attenuation filter (referred to simply as "filter"), 11 a filter base, 12 a conductive mesh provided on one face of the filter base 11, 22 an antistatic layer, and 23 an adhesive intended to adhere the antistatic layer 22 to the conductive mesh 12.

To form the antistatic layer 22, conductive metallic oxides, such as stannic oxide, and antimony are mixed into fine particles, and then this mixture is dissolved into the required solution, for example, a mixed solution (antistatic agent) of pure water, alcohol and surface-active agent. Spraying this new solution on a colorless, transparent film or applying it by the bar coat method allows the generation of an antistatic layer having a surface resistivity of the order of $10^6$ ohms per square centimeter. The antistatic layer 22 thus made is adhered onto the conductive mesh 12 of the filter base 11 with the acrylic-based adhesive 23 so as not to impart any electric charge in between the grids of the conductive mesh 12 (where the filter base 11 is).

With this filter 2C thus far described, the antistatic layer 22 is provided between the PDP 1 and the conductive mesh 12 to prevent the electromagnetic wave leakage of the PDP 1. Even if the pulse voltage applied to the PDP 1 for write/erase generates an electric charge on the conductive mesh 12, the voltage remains low, leading to no discharge and abnormal noise.

In any prior art filter without this antistatic layer 22, the electric charge remains due to the filter 2, which is a high insulator, even after about 140 V of charge is generated on the conductive mesh 12 by write/erase of the PDP 1, and this charge is imparted to the portion 41 surrounded by the grids of the conductive mesh 12 as shown in FIG. 3, and the charge of the conductive mesh 12 flows to ground to be 0 V through the mounting bracket 7. It then discharges toward the conductive mesh 12, which is now at 0 V. Conversely, in the embodiment of the present invention as shown in FIGS. 8 and 9, the provision of the antistatic layer 22 between the PDP 1 and the conductive mesh 12 provides a state as if the electrodes were inserted between the PDP 1 and the antistatic layer 22, said 140 V being divided (voltage ratio as inversely proportional to the volume percentage) by the capacity between the PDP 1 and the antistatic layer 22 as well as that between the antistatic layer 22 and the conductive mesh 12, and consequently the charge as generated on the conductive mesh 12 decreases to a value lower than 140 V, the voltage preventing the discharge. Hence, there will be no discharge nor abnormal noise.

Figure 10:
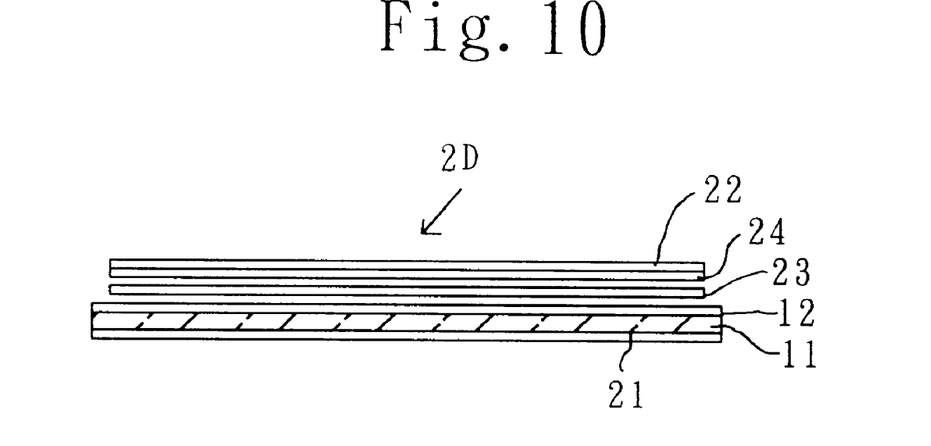
FIG. 10 depicts an elevational cross-section view of the essential part of an embodiment wherein an AR film and AG/AR film are provided on the electromagnetic wave leakage attenuation filter as shown in FIG. 9.

FIG. 10 illustrates an embodiment where, in the filter 2C shown in FIG. 9, the antistatic layer 22 is formed on the AG/AR film and the AR film is adhered onto the external face side (lower portion in the figure) of the filter base 11 to form the filter 2D.

The AG/AR film 24, which is an example of a light scattering/reflection prevention film, results from the formation of a fine roughness on the surface of a colorless, transparent film with a light coming, for example, from a lighting fixture scattered irregularly to avoid any glare and overlap with the image of the PDP 1, which makes it difficult to have a clear view of the picture. Vacuum evaporation, on this AG/AR film 24, of plural superposed films from materials of different refractive indices, or application of a fluororesin on this AG/AR film 24, provides a film at which the incidental light is exposed to complex refraction to make it difficult for the light to return back to the incidental direction. The AR film 21 is formed from the vacuum evaporation of plural superposed films made of materials of different refractive indices or application of fluororesin on a transparent film, exposing the light incident to the filter body to complex refraction so that it becomes difficult to return, thus preventing the reduction in contrast of the image due to the reflection of exterior light.

Figure 11:
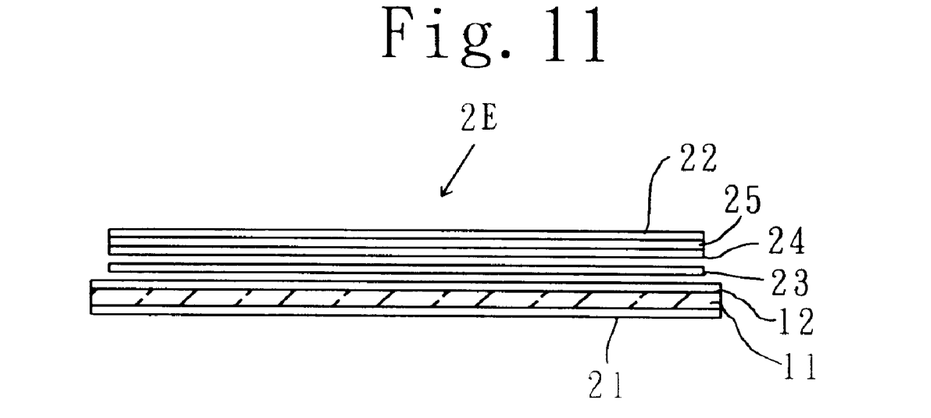
FIG. 11 illustrates an elevational cross-section view of the essential part of an embodiment wherein a primer coat is applied on the electromagnetic wave leakage attenuation filter shown in FIG. 10.

FIG. 11 shows an embodiment of the invention where, in the filter 2D shown in FIG. 10, the AG/AR film 24 has applied on its surface a primer coat (that is undercoated) to form a primer coat layer 25 on which an antistatic layer 22 is formed to make the filter 2E. This is because when a fluororesin is applied for AR treatment of the AG/AR film 24, the antistatic agent is repelled by the fluororesin film, which hinders good adhesion. This therefore necessitates the application beforehand of a surface-active agent (primer coating) on the surface of the AG/AR film 24. Since other configurations are the same as those of FIG. 10, we will omit the description thereof.

INDUSTRIAL AVAILABILITY

As has so far been described, the electromagnetic wave leakage attenuation filter of the present invention, which can be used to circumvent the leakage of electromagnetic waves from a display (pdp display, for example), is suited such that when the pulse voltage to be applied to the image display portion (for example, the pulse voltage to be applied on the pdp for write/erase) generates an electric charge between the grids of the conductive mesh provided for inhibition of the electromagnetic wave leakage, the charge thus generated does not lead to any discharge nor to any abnormal noise.

What is claimed is:

1. In an electromagnetic wave leakage attenuation filter for preventing the leakage of electromagnetic waves from a plasma display panel, the improvement comprising said filter comprising a filter base provided at a frontal face of the plasma display panel, a grounded light-transmitting conductive mesh provided on the surface of the filter base between the filter base and the plasma display panel, a light-scattering layer for subjecting any incident exterior light to irregular reflection and a light-transmitting conductive adhesive for adhering the light-scattering layer to the conductive mesh.

2. The electromagnetic wave leakage attenuation filter as claimed in claim 1, characterized in that said light scattering layer result from the roughening of the surface of a colorless, transparent film to suppress the generation of Newton's rings.

3. The electromagnetic wave leakage preventing filter as claimed in claim 1, wherein the filter base comprises means for absorbing a particular visible light and means for absorbing a particular invisible electromagnetic radiation released from the plasma display panel.

4. In an electromagnetic wave leakage attenuation filter for preventing the leakage of electromagnetic waves from a plasma display panel, the improvement comprising said filter comprising a filter base provided at a frontal face of the plasma display panel, a grounded light-transmitting conductive mesh provided between the filter base and the frontal face of the plasma display panel, a light scattering film having a roughened surface for suppressing the generation of Newton's rings adhered to the conductive mesh and a transparent antistatic layer provided between the conductive mesh and the frontal face of the plasma display panel and on the light scattering film.

5. The electromagnetic wave leakage attenuation filter as claimed in claim 4, wherein the antistatic layer is formed by applying a transparent antistatic agent on the light scattering film.

6. The electromagnetic wave leakage attenuation filter as claimed in claim 4, wherein the antistatic layer is formed by applying the transparent antistatic agent on the face of the light scattering film after a pretreatment with a surface active agent.

7. The electromagnetic wave leakage attenuation filter as claimed in claim 4, 5, or 6, wherein the filter base comprises, on its colorless, transparent synthetic resin substrate, means for absorbing a particular visible light and means for absorbing a particular invisible electromagnetic radiation released from the plasma display panel.

8. The electromagnetic wave leakage attenuation filter as claimed in claim 7, wherein the filter base is provided with a light reflection preventing layer that avoids the reflection of exterior light.

* * * * *